US012149083B2

(12) United States Patent
Sharma et al.

(10) Patent No.: US 12,149,083 B2
(45) Date of Patent: Nov. 19, 2024

(54) CONTROLLER AND METHOD FOR BALANCING DISCHARGE OR CHARGE OF BATTERY PACKS IN ENERGY STORAGE SYSTEM

(71) Applicants: China Energy Investment Corporation Limited, Beijing (CN); National Institute of Clean-and-Low-Carbon Energy, Beijing (CN)

(72) Inventors: Ratnesh Sharma, Fremont, CA (US); Surinder Singh, Fremont, CA (US); Brandon Ohara, Mountain View, CA (US); Motoko Furukawa, San Jose, CA (US); Roger Keyes, Mission, KS (US)

(73) Assignees: China Energy Investment Corporation Limited, Beijing (CN); National Institute of Clean-and-Low-Carbon Energy, Beijing (CN)

( * ) Notice: Subject to any disclaimer, the term of this patent is extended or adjusted under 35 U.S.C. 154(b) by 529 days.

(21) Appl. No.: 17/506,153

(22) Filed: Oct. 20, 2021

(65) Prior Publication Data

US 2023/0117104 A1 Apr. 20, 2023

(51) Int. Cl.
*H02J 7/00* (2006.01)
*B60L 53/63* (2019.01)
(Continued)

(52) U.S. Cl.
CPC .............. *H02J 3/322* (2020.01); *B60L 53/63* (2019.02); *B60L 55/00* (2019.02); *B60L 58/13* (2019.02);
(Continued)

(58) Field of Classification Search
CPC .... H02J 7/0014; H02J 7/0048; H02J 2310/48; H02J 3/322; H02J 3/32; B60L 53/63; B60L 55/00; B60L 58/13
(Continued)

(56) References Cited

U.S. PATENT DOCUMENTS

| 7,971,345 B2 | 7/2011 | Okumura et al. |
| 2010/0285339 A1 | 11/2010 | Chaturvedi et al. |
| 2014/0176079 A1* | 6/2014 | Ito .......................... B60L 58/14 |
| | | 320/134 |

FOREIGN PATENT DOCUMENTS

| AU | 2018236771 B2 | 10/2018 |
| CN | 104935045 B | 9/2015 |

(Continued)

*Primary Examiner* — Zixuan Zhou
(74) *Attorney, Agent, or Firm* — Calfee, Halter & Griswold LLP (57) ABSTRACT

A controller, a system including such a controller, and a method for controlling or managing discharge or charge of a plurality of battery packs are provided. The controller includes one or more processor and at least one tangible, non-transitory machine readable medium encoded with one or more programs configured to perform steps to determine a respective power discharge or charge for each battery packs based on characteristic data of each battery pack, a power demand, and the first weighting factor (a) and the second weighting factor (b) for power assignment based on voltage and state of charge of each battery pack. The controller provides signals with instructions to the plurality of battery packs and/or the one or more power converters for discharging power from or charging power to the plurality of battery packs.

20 Claims, 5 Drawing Sheets

(51) Int. Cl.
*B60L 55/00* (2019.01)
*B60L 58/13* (2019.01)
*H02J 3/32* (2006.01)

(52) U.S. Cl.
CPC .............. *H02J 3/32* (2013.01); *H02J 7/0014* (2013.01); *H02J 7/0048* (2020.01); *H02J 2310/48* (2020.01)

(58) Field of Classification Search
USPC ........................... 320/109, 116–119; 701/22
See application file for complete search history.

(56) References Cited

FOREIGN PATENT DOCUMENTS

| | | |
|---|---|---|
| CN | 110518667 A | 11/2019 |
| EP | 2555311 B1 | 2/2016 |

* cited by examiner

CONTROLLER AND METHOD FOR BALANCING DISCHARGE OR CHARGE OF BATTERY PACKS IN ENERGY STORAGE SYSTEM

PRIORITY CLAIM AND CROSS-REFERENCE

None.

FIELD OF THE INVENTION

The disclosure relates to systems and methods for controlling or managing battery packs generally. More particularly, the disclosed subject matter relates to a controller, a system, and a method for balancing discharge or charge of battery packs, for example, in energy storage application.

BACKGROUND

Clean and renewable sources of energy become more important due to increased concerns about environmental issues such as global warming. Such sources include solar and wind power, and rechargeable battery. Renewable energy sources are intermittent because they cannot always be dispatched when needed to meet the changing requirements of energy consumers. Energy storage systems are expected to solve this flexibility challenge. A stationary energy storage system can store energy and release energy in the form of electricity when it is needed.

SUMMARY OF THE INVENTION

The present disclosure provides a controller for controlling or managing discharge or charge of heterogeneous battery packs, a system such as an electrical energy storage system comprising such a controller, and methods of using the same.

In accordance with some embodiments, the controller, the system, and the method utilize a technique of balancing discharge or charge of the plurality of battery packs based on voltage and state of charge of each battery pack in the system.

In accordance with some embodiments, a system comprises a plurality of battery packs, one or more power converters, and one or more controller. Each power converter is coupled with at least one of the plurality of battery packs, and is configured to convert direct current (DC) from one battery pack to alternating current (AC) or vice versa. The controller is coupled to the plurality of battery packs and the one or more power converters. In some embodiments, the system may also include more than one controller, and each controller is coupled to a plurality of battery packs.

The plurality of battery packs are defined and described herein. In some embodiments, the plurality packs are heterogeneous battery packs, which can be selected from new batteries, second-use electric vehicle (EV) batteries, or combinations thereof. The plurality of battery packs are connected in parallel, in series, or in a combination (i.e. hybrid combinations) thereof. In some embodiments, the plurality of battery packs are connected in parallel.

The controller comprises one or more processors and at least one tangible, non-transitory machine readable medium encoded with one or more programs configured to perform steps for controlling or managing a discharging process or a charging process of the system having the plurality of battery packs. In some embodiments, these steps include: collecting characteristic data of each battery pack including a present voltage ($V_i$), state of charge ($SOC_i$), a number of cells in each battery packs (Nc), a maximum voltage ($V_{c\ max}$) and a minimum voltage ($V_{c\ min}$) of a cell; and receiving a total power demand (D) (or called total dispatch power) needed to be dispatched from the system or to be charged to the system in a first time interval. The steps further comprise assigning a first weighting factor (a) and a second weighting factor (b) for power assignment based on voltage and state of charge of each battery pack, respectively, wherein a+b=1. The steps further comprise determining a respective power discharge or charge for each battery pack based on the present voltage ($V_i$), the state of charge ($SOC_i$), the number of cells in each battery pack (Nci), the maximum voltage ($V_{c\ max}$) and the minimum voltage ($V_{c\ min}$) of a cell, the first weighting factor (a), the second weighting factor (b), and the total power demand (D); and providing signals with instructions to the plurality of battery packs and the one or more power converters for discharging power from or charging power to the plurality of battery packs based on the respective power discharge or charge of each battery pack and/or keeping a certain battery pack idle.

In some embodiments, the step of determining a respective power discharge or charge for each battery pack comprises steps including: calculating voltage distribution parameter ($V_i'$) for each cell in a respective battery pack, wherein $V_i'=(V_i/N_{ci}-V_{c\ min})/(V_{c\ max}-V_{c\ min})$; setting a baseline SOC ($SOC_b$) for each of the plurality of battery packs; and calculating a variation of state of charge ($SOC_i'$) for each battery pack.

The variation of state of charge ($SOC_i'$) is calculated by using the conditions and equations as described herein. For discharge (D<0), when $SOC_i>SOC_b$, $SOC_i'=SOC_i-SOC_b$, or when $SOC_i \leq SOC_b$, $SOC_i'=0$. For charge (D>0), when $SOC_i<SOC_b$, $SOC_i'=SOC_b-SOC_i$ or when $SOC_i \geq SOC_b$, $SOC_i'=0$.

The steps further comprise calculating a voltage-charge combination factor ($C_i$) of each battery pack, wherein $C_i$ is defined as $C_i=a*V_i'+b*SOC_i'$; and calculating a respective power discharge or charge ($d_i$) for each battery pack. The respective power discharge or charge ($d_i$) for each battery pack is based on the total power demand (D) and the voltage-charge combination factor ($C_i$) of each battery pack, wherein $d_i=D*C_i/Sum\ (C_i)$. Sum ($C_i$) is a sum of the voltage-charge combination factor of ($C_i$) of each and every of the plurality of battery packs.

When the respective power discharge or charge of a certain battery pack is zero, the specific battery pack is kept idle without discharging or charging.

The controller is also configured to repeat some or all the steps to re-determine the respective power discharge or charge for each battery pack in a second time interval after the first time interval ends.

The system may optionally further comprise one or more battery power management unit (BPMU). Each BPMU may be connected with one or more battery packs, and is configured to monitor the one or more battery packs and provide characteristic data of the one or more battery packs to the controller.

In some embodiments, the system is an electrical energy storage system. The total power demand is provided from an upper level energy management system (EMS). In some embodiments, the controller is configured to discharge power from the plurality of battery packs to a grid or load or charge power from the grid or load to the plurality of battery packs. In some embodiments, the grid is optional. The power can be discharged to other components, in which electrical power is needed.

The time interval can be in any suitable ranges. The first and the second time intervals can be the same or different. The controller can be configured to dynamically control discharging or charging of the plurality of battery packs by updating the respective power discharge or charge for each battery pack instantaneously with time.

In another aspect, the present disclosure provides a controller as described herein for controlling or managing discharge or charge of a system comprising a plurality of battery packs. As described herein, such a controller comprises one or more processor and at least one tangible, non-transitory machine readable medium encoded with one or more programs configured to perform the steps as described herein.

The controller is configured to provide signals with instructions to the plurality of battery packs and the one or more power converters for discharging power from (or charging power to) the plurality of battery packs based on the respective discharge power of each battery pack and/or keeping a certain battery pack idle.

The plurality of battery packs, which the controller is configured to be coupled with, are heterogeneous battery packs selected from new batteries, second-use electric vehicle (EV) batteries, or combinations thereof. The plurality of battery packs are connected in parallel, in series, or in a combination thereof.

The controller is configured for controlling discharge or charge of heterogeneous battery packs, for example, in an electrical energy storage system. In some embodiments, the controller is configured to discharge power from the plurality of battery packs to a grid or load, or charge power from the grid or load to the plurality of battery packs.

In another aspect, the present disclosure also at least one tangible, non-transitory machine readable medium encoded with the one or more programs as described herein.

In another aspect, the present disclosure provides a method for controlling or managing discharge or charge of a system comprising a plurality of battery packs through a controller therein as described herein. The method includes steps of: collecting characteristic data of each battery pack including a present voltage ($V_i$), state of charge ($SOC_i$), a number of cells in each battery packs (Nc), a maximum voltage ($V_{c\ max}$) and a minimum voltage ($V_{c\ min}$) of a cell; and receiving a total power demand (D) (or called total dispatch power) needed to be dispatched from the system or to be charged to the system in a first time interval. The steps further comprise assigning a first weighting factor (a) and a second weighting factor (b) for power assignment based on voltage and state of charge of each battery pack, respectively, wherein a+b=1. The steps further comprise determining a respective power discharge or charge for each battery pack based on the present voltage ($V_i$), the state of charge ($SOC_i$), the number of cells in each battery packs (Nci), the maximum voltage ($V_{c\ max}$) and the minimum voltage ($V_{c\ min}$) of a cell, the first weighting factor (a), the second weighting factor (b), and the total power demand (D).

In some embodiments, the step of determining a respective power discharge or charge for each battery pack comprises steps including: calculating voltage distribution parameter ($V_i'$) for each cell (or per cell) in a respective battery pack, wherein $V_i'=(V_i/N_{ci}-V_{c\ min})/(V_{c\ max}-V_{c\ min})$; setting a baseline SOC ($SOC_b$) for each of the plurality of battery packs; and calculating a variation of state of charge ($SOC_i'$) for each battery pack.

The variation of state of charge ($SOC_i'$) is calculated by using the conditions and equations as described herein. For discharge (D<0), when $SOC_i>SOC_b$, $SOC_i'=SOC_i-SOC_b$, or when $SOC_i \leq SOC_b$, $SOC_i'=0$. For charge (D>0), when $SOC_i<SOC_b$, $SOC_i'=SOC_b-SOC_i$ or when $SOC_i \geq SOC_b$, $SOC_i'=0$.

The steps further comprise calculating a voltage-charge combination factor ($C_i$) of each battery pack, wherein $C_i$ is defined as $C_i=a*V_i'+b*SOC_i'$; and calculating a respective power discharge or charge ($d_i$) for each battery pack. The respective power discharge or charge ($d_i$) for each battery pack is based on the total power demand (D) and the voltage-charge combination factor ($C_i$) of each battery pack, wherein $d_i=D*C_i/\text{Sum}\ (C_i)$. Sum ($C_i$) is a sum of the voltage-charge combination factor of ($C_i$) of each and every of the plurality of battery packs.

In such a method, the controller also provides signals with instructions to the plurality of battery packs and the one or more power converters for discharging power from or charging power to the plurality of battery packs based on the respective power discharge or charge of each battery pack and/or keeping a certain battery pack idle as described herein. In some embodiments, instructions are sent from the controller to each battery pack and/or one or more converter connected with the plurality of battery packs for discharging or charging based on the respective power discharge or charge of each battery pack.

The plurality of battery packs are heterogeneous battery packs selected from new batteries, second-use electric vehicle (EV) batteries, or combinations thereof. The plurality of battery packs are connected in parallel, in series, or in a combination thereof.

The baseline SOC ($SOC_b$) for each of the plurality of battery packs can be any suitable range, for example, from 10% to 90%, from 20% to 80%, from 30% to 70%, from 20% to 60%, or from 40% to 60%. A certain battery pack is kept idle when the respective power discharge or charge is assigned to zero.

The steps described herein may be repeated to re-determine the respective power discharge or charge for each battery pack in a second time interval after the first time interval ends. The first and the second time intervals are in any range, for example, from 1 minute to 1 hour, and can be the same or different. The discharging process of the plurality of battery packs can also be dynamically controlled by updating the respective power discharge or charge of each battery pack instantaneously with time.

The system, the controller, and the method provided in the present disclosure offer many advantages. For example, a variety of new and used battery packs having different quality can be used. No pre-selection or dismantle of the battery packs are needed. The plurality of heterogeneous battery packs collectively supply power load to satisfy the power demand while each battery pack may discharge at a different share. As described herein, the system, the controller, and the method extend the life of battery packs through a balanced approach.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

References to "heterogeneous battery packs" made herein refer to battery packs or modules having different capacity, state of charge (SOC), state of heath (SOH), and/or voltages, and can be selected from new batteries (e.g., from different manufacturers), second-use electric vehicle (EV) batteries, or combinations thereof. Second-use EV batteries are used for illustration purpose. References to "discharging" from or "charging" to the plurality of battery packs are understood that the plurality of batteries packs collectively discharge or be charged, while it is possible that some battery packs may stay idle (without charging or discharging).

Unless expressly indicated otherwise, references to "state of health (SOH)" made herein will be understood to mean a figure of merit of the condition of a battery, a battery cell, or a battery pack compared to its ideal conditions. SOH is characterized in percentage (%). The condition matching the specifications under the ideal conditions is 100%. SOH may decrease over time and use.

Unless expressly indicated otherwise, "state of charge" (SOC) described herein is defined as a level of charge of an electric battery relative to its capacity. The units of SOC are percentage points, 0% means empty, and 100% means full.

The term "human machine interface (HMI)" used herein is understood to refer to user interface (UI) is the space where interactions between humans and machines occur. A human-machine interface (HMI) may involve interfaces between human and machines with physical input hardware such as keyboards, mice, or any other human interaction based on tactile, visual, or auditory senses. Such user interfaces may include other layers such as output hardware such as computer monitors, speakers, and printers.

The term "energy management system (EMS)" used herein refers to a system of computer-aided tools used by operators of electric utility grids to monitor, control, and optimize the performance of the generation or transmission system.

In the present disclosure, the terms "power demand," "power dispatch," and "power requirement" are used interchangeably, and can be referred to the power needed for either a discharging or a charging process. The terms "converter" and "inverter" can be used interchangeably. Each battery pack includes an inverter and a battery management unit (BMU) therein. For the convenience of description, the term "power inverter" or "AC/DC power converter" is used to describe the internal component in a battery pack, and the term "power converter" or "power conversion system (PCS)" is used to describe the converter connected with one or more battery packs. The term of "battery management unit (BMU)" or "battery management system (BMS)" is used to describe the internal component in a battery pack, and the term "battery power management unit (BPMU)" is used to describe the battery management unit connected with one or more battery packs.

In the present disclosure, the terms "power" and "energy" may be used interchangeably, when the energy are described in a unit of time. Energy and power can be converted with time.

Unless expressly indicated otherwise, the term "connected" or "coupled" used herein are understood to encompass different connections or coupling between or among the components so as to conduct electricity or transmit signals for communication. Such a connection or coupling can be through wire, wireless, or cloud-based modes.

Power dispatch (discharge) is a function of charge flow and voltage. Dispatch energy is defined as dispatch power over a user-specified period of time. Sometimes lower voltage discharge provides higher energy. Earlier approaches have not considered the impact of voltage on the decision of power or energy dispatch. Moreover, heterogeneity in the voltages of battery packs has not been considered. A more efficient method for using the heterogeneous battery packs is needed.

The present disclosure provides a controller for controlling discharge or charge of heterogeneous battery packs, a system such as an electrical energy storage system comprising such a controller, and methods of using the same. The present disclosure provides such a controller, such a system, and such a method to efficiently utilize heterogeneous batteries such as new batteries from different manufactures or second-use electric vehicle (EV) battery packs in energy storage applications. Preselecting or dismantling packs is not required. In accordance with some embodiments, the controller, the system, and the method utilize a technique of balancing discharge or charge of the plurality of battery packs based on both voltage and state of charge of each battery pack in the system. Each battery pack can be charged or discharged differently.

The controller, the system, and the method provided in the present disclosure apply to different battery packs. The battery packs may have the same or different chemistries, same or different performance or degradation, same or different physical and/or electrical performances. In some embodiments, the battery packs are heterogeneous battery packs.

In some embodiments, the present disclosure provides a method to balance diverse set of battery packs in an energy storage system based on the individual pack voltage and individual pack SOC. The method relies on measurement of individual pack voltage and SOC at an instant and splitting the dispatch power into individual portions from each battery pack. The split is based on the difference in instantaneous pack voltage from the voltage budget (Vmax−Vmin) and the difference in SOC from base SOC desired for the packs. The split is adjusted for both charge and discharge such that over a period of time all the packs reach a balanced state where the voltage and the SOC of all the packs are in a tight range.

Figure 1:
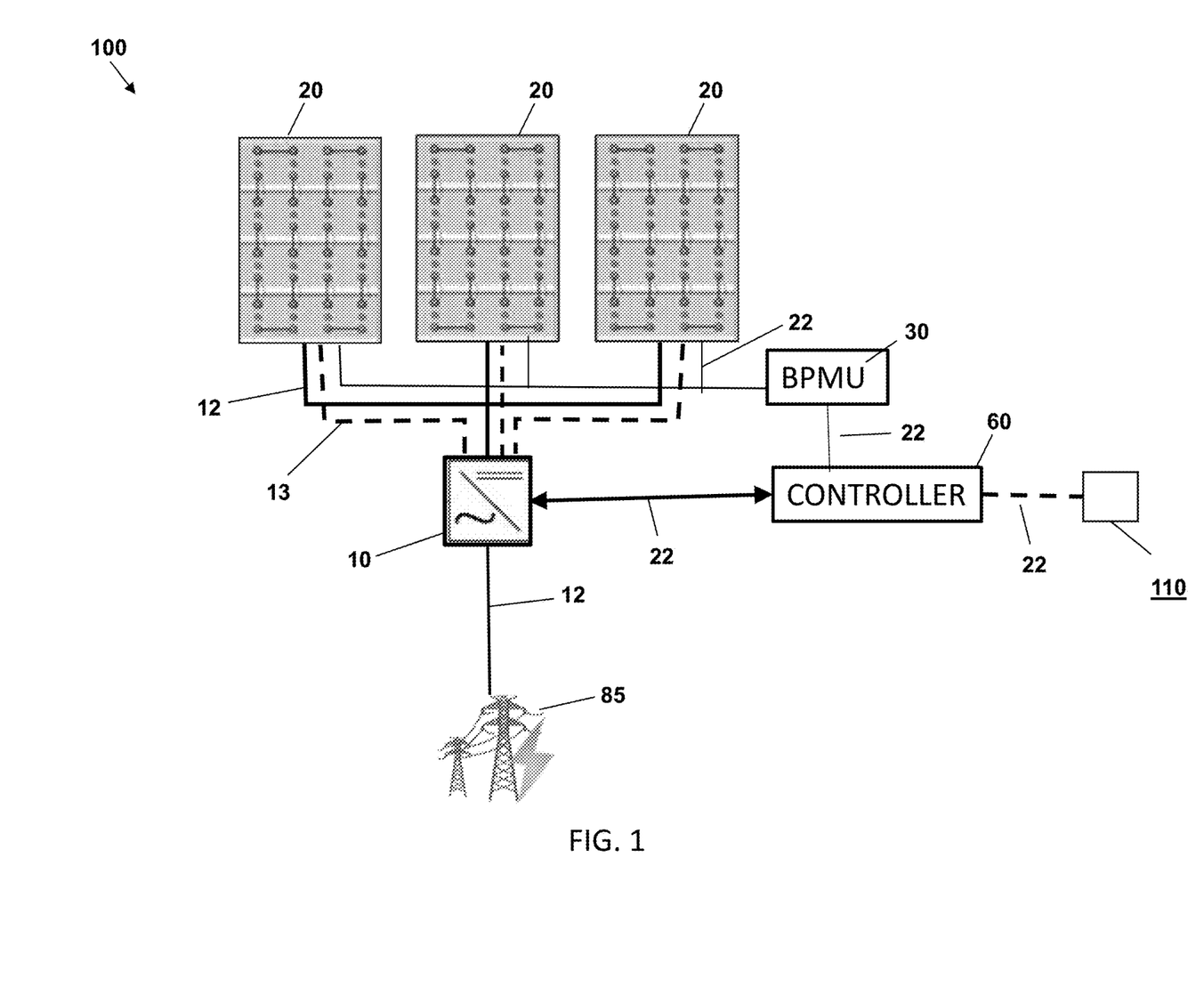
FIG. 1 is a block diagram illustrating an exemplary system comprising heterogeneous battery packs and a controller in accordance with some embodiments.
Figure 2:
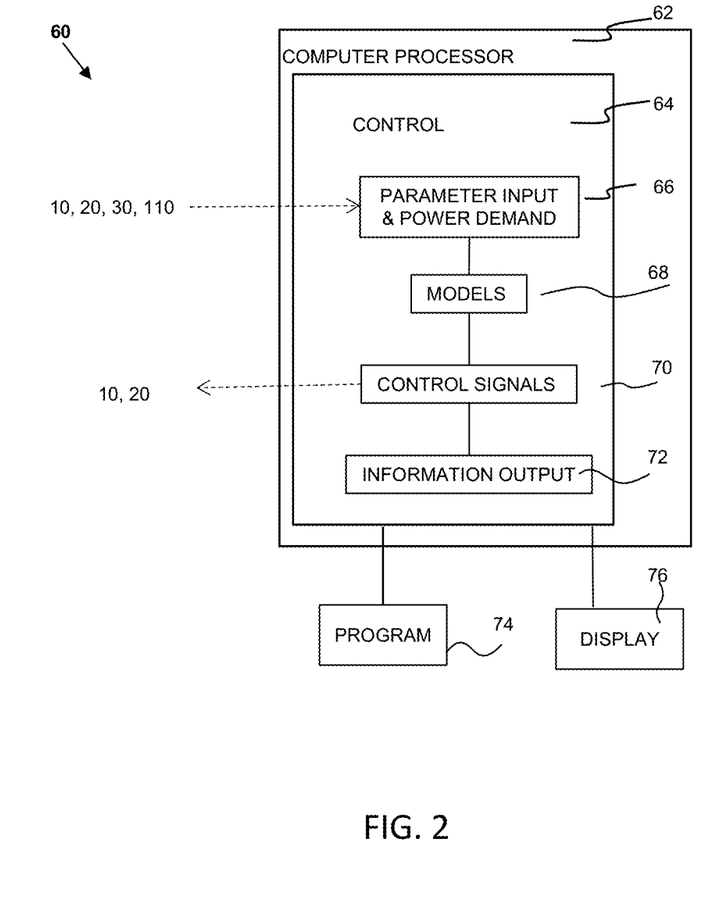
FIG. 2 is a block diagram illustrating an exemplary controller comprising one or more processor and at least one tangible, non-transitory machine readable medium encoded with one or more programs, for controlling or managing discharge or charge of a plurality of heterogeneous battery packs in accordance with some embodiments.
Figure 4:
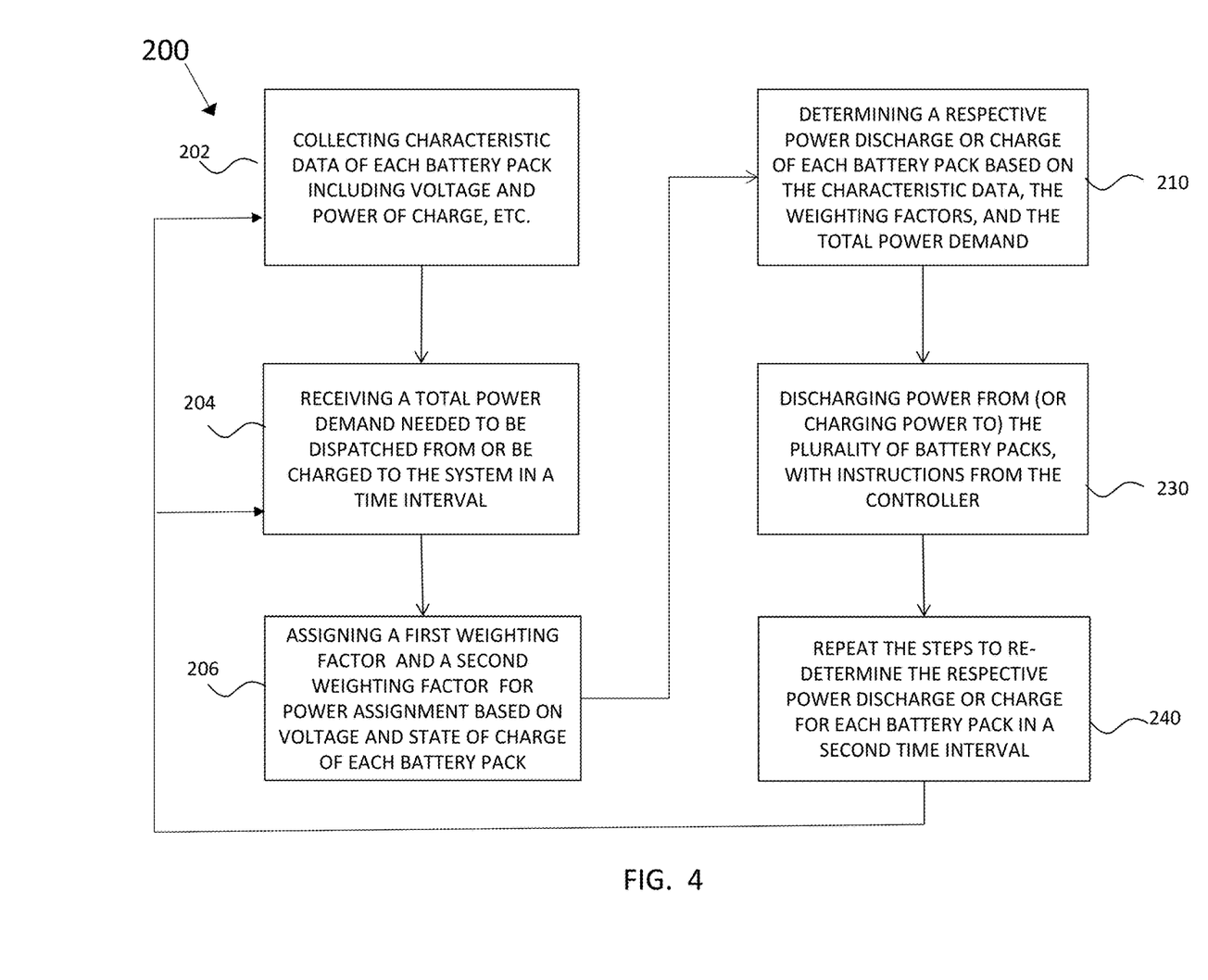
FIG. 4 is a flow chart illustrating an exemplary method for controlling discharge or charge of battery packs in accordance with some embodiments.
Figure 5:
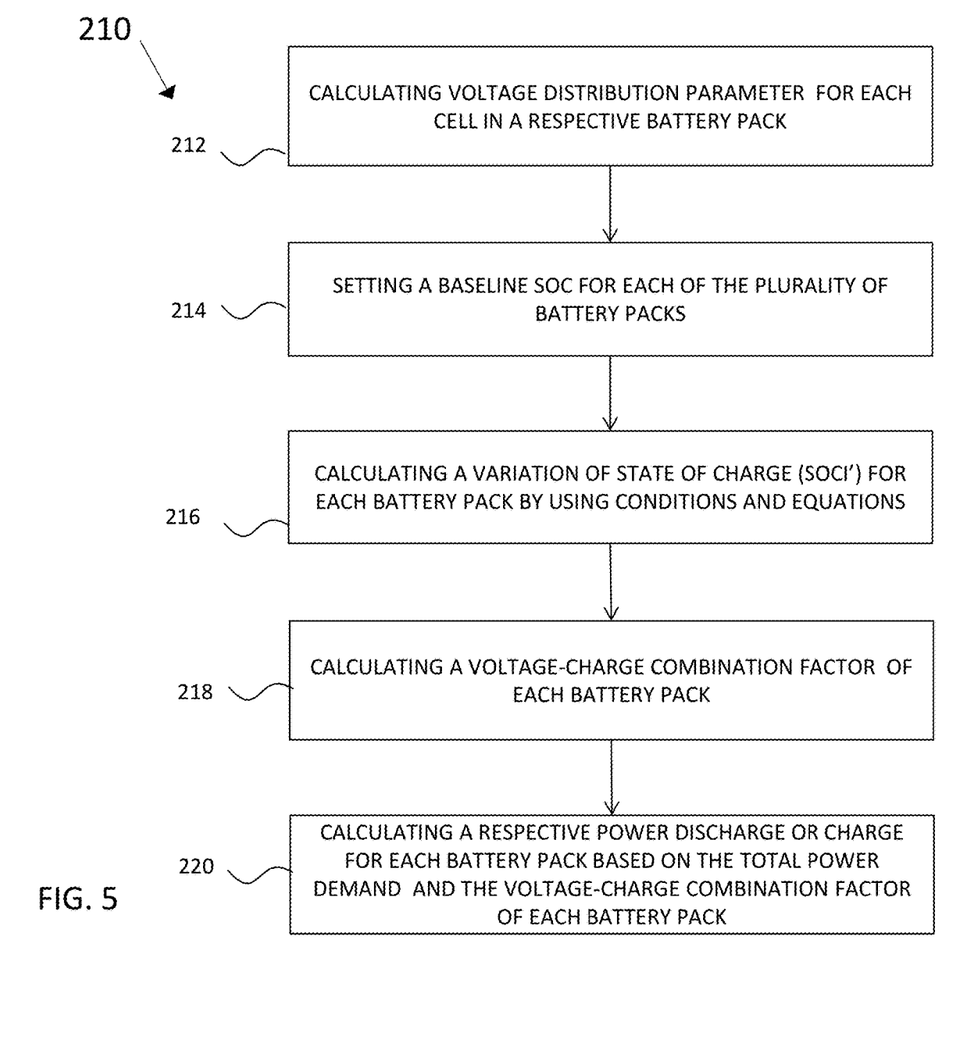
FIG. 5 is a flow chart illustrating exemplary steps for determining a respective power discharge or charge for each battery pack in the exemplary method of FIG. 4 in accordance with some embodiments.

In FIGS. 1-2, like items are indicated by like reference numerals, and for brevity, descriptions of the structure, provided above with reference to the preceding figures, are not repeated. The methods in FIGS. 4-5 are described with reference to the exemplary structure described in FIGS. 1-2.

Referring to FIG. 1, an exemplary system 100 comprises one or more power converters 10, a plurality of battery packs 20, and a controller 60. The number of each component and the configuration in FIG. 1 are for illustration only. The system may have any suitable number of each component in any suitable combination or configuration.

Each power converter 10 is coupled with at least one of the plurality of battery packs 20, and is configured to convert direct current (DC) from a battery pack to alternating current (AC) or vice versa. The power converter 10 can be also called as power conversion system (PCS) or an inverter.

The controller 60 is coupled to the plurality of battery packs 20 and the one or more power converters 10. In some embodiments, the system may also include more than one controller 60, and each controller 60 is coupled to a plurality of battery packs 20.

The controller 60 may be coupled to the plurality of battery packs 20 directly or indirectly. For example, in some embodiments, the exemplary system 100 may optionally further comprise one or more battery power management unit (BPMU), which can be also called battery management unit (BMU). Each BPMU 30 may be connected with one or more battery packs 20, and is configured to monitor the one or more battery packs 20 and provide characteristic data of the one or more battery packs 20 to the controller 60. In some embodiments, the controller 60 is configured to read the data from each battery pack 20. This may be done through each respective BPMU 30 connected with each battery pack.

The plurality of battery packs 20 are heterogeneous battery packs, which can be selected from new batteries, second-use electric vehicle (EV) batteries, or combinations thereof. The plurality of battery packs 20 are connected in parallel, in series, or in a combination thereof. In some embodiments, the plurality of battery packs 20 are connected in parallel. No series connection between battery packs eliminates circulating currents and losses.

As shown in FIG. 1, the plurality of battery packs 20 are connected in a parallel configuration. In some embodiments, the plurality of battery packs 20 are second-use (i.e. used) electric vehicle (EV) batteries. The used EV batteries can be directly utilized in the system, without pre-selection or dismantling. Each battery pack 20 comprises a battery or batteries. Each battery packs 20 may include an internal battery management unit (BMU), and an internal inverter. EV battery packs 20 are removed from vehicles and are not disassembled into modules. Simple tests may be done on these EV battery packs 20 to verify their SOH.

In some embodiments, the exemplary system 100 is an electrical energy storage system. The controller 60 is configured to receive a total power demand provided from an upper level energy management system (EMS) 110 or calculated the total power demand based on input data received from the EMS. In some embodiments, the controller 60 is configured to discharge power from the plurality of battery packs 20 in direct current to a grid or load 85 in alternating current, or vice versa. The exemplary system 100 can be used for discharging power from battery packs 20 to a grid 85, or for charging from the grid 85 to battery packs 20. Wire connection 12 may be used. The dotted lines 13 in FIG. 1 illustrates alternative power cables. Multiple power cable topologies may exist between the converter 10 and battery packs 20. The system 100 directly uses grid tied AC/DC converters 10 with flexibility in size expansion. No additional power conversion system is required for grid tied applications.

In some embodiments, the grid 85 is optional. The power can be discharged to other components, in which electrical power is needed.

The controller 60 may be connected with other components in wire or wireless mode. In the exemplary system 100 illustrated in FIG. 1, the controller 60 may be connected with other components such as converter 10, BPMU 30 and EMS 110 via data cable or wireless connection 22. The BPMU 30 may be also connected with battery packs 20 via data cables or wireless connection 22. The controller 60 can work in a cloud-based mode.

Each battery pack 20 may be connected to a power converter 10 (or independent DC port on a converter 10) through a set of automatic DC circuit breakers (not shown), which activate and control the connection between a battery pack 20 and the converter 10. The converter 10 controls whether or not to charge or discharge the single EV battery pack 20 by following the instructions from the controller 60.

Referring to FIG. 2, the controller 60 comprises one or more processors 62 and at least one tangible, non-transitory machine readable medium encoded with one or more programs configured to perform steps for controlling a discharging process of the system having the plurality of battery packs. The controller 60, the processor 62, and/or the program 74 may be an external device to the converter 10, or be an internal device inside the converter 10.

The processor(s) 62 may include a central control 64, which includes a parameter input module 66, model module 68, a parameter control module 70, and information and instruction module 72. The parameter input module 66 coordinates with the battery packs 20, optionally BPMU 30 and HMI or EMS 110, to read the data from battery packs 20 and power demand from HMI or EMS 110. The parameter input module 66 also coordinates with each power converter 10. The parameter control module 70 coordinates with each power converter 10 and each battery pack 20, and optionally with BPMU 30 and HMI or EMS 110 to control a process of discharging. Together with the one or more programs 74, the model module 68 is configured to perform a simulation based on the input parameters to provide information and instruction to the parameter control module 70 and the information and instruction module 72. The processors 62 may be optionally connected with one or more displays 76 for displaying the information and instructions from module 72 and to an operator.

The controller 60 with the programs 74 and the processor 62 are configured to perform steps for discharging or charging as described herein. As described in FIG. 4, in some embodiments, the controller 60 is configured to perform the steps described herein. These steps include: collecting characteristic data of each battery pack 20, and receiving or calculating a total power demand (D) needed to be dispatched from the system 100 or to be charged to the system 100 in a first time interval. The characteristic data of each battery pack 20 include, but are not limited to, a present voltage ($V_i$), state of charge ($SOC_i$), a number of cells in each battery packs (Nc), a maximum voltage ($V_{c\ max}$) and a minimum voltage ($V_{c\ min}$) of a cell. The number of battery packs is represent as "n." The subscript "i" represents battery packs from 1 to n.

The total power demand (D) may be in Kilowatts. Each battery pack 20 may have a maximum voltage ($V_{max}$) and a minimum voltage for discharge ($V_{min}$), which can be derived from a curve (e.g., FIG. 3) of voltage versus charge of each battery pack 20. Each cell may have a maximum voltage ($V_{c\ max}$) and a minimum voltage ($V_{c\ min}$). The maximum voltage ($V_{max}$) and a minimum voltage for discharge ($V_{min}$) of a battery pack are the number of cells in a battery pack times the maximum voltage ($V_{c\ max}$) and the minimum voltage ($V_{c\ min}$) of a cell. In some embodiments, different cells have the same set of $V_{c\ max}$ and $V_{c\ min}$. Sometimes average values of different cells are used. For example, in the Examples, the maximum voltage ($V_{c\ max}$) and the minimum voltage ($V_{c\ min}$) of a cell used are 4.2 volts and 3.5 volts, respectively.

The steps further comprise assigning a first weighting factor (a) and a second weighting factor (b) for power assignment based on voltage and state of charge of each battery pack, respectively. Each of the factors a and b is between 0 and 1, for example, in a range of from 0.01 to 0.99. The sum of a and b is 1 as shown in Equation (1)

$$a+b=1 \tag{1}$$

The steps further comprise determining a respective power discharge or charge for each battery pack based on the present voltage ($V_i$), the state of charge ($SOC_i$), the number of cells in each battery packs (Nci), the maximum voltage ($V_{c\ max}$) and the minimum voltage ($V_{c\ min}$) of a cell, the first weighting factor (a), the second weighting factor (b), and the total power demand (D).

In some embodiments, the controller 60 is configured to determine a respective power discharge or charge for each battery pack as follows.

Voltage distribution parameter ($V_i'$) for a cell (or an average cell) in a respective battery pack is defined and calculated using Equation (2):

$$V_i'=(V_i/N_{ci}-V_{c\ min})/(V_{c\ max}-V_{c\ min}) \tag{2}$$

A baseline SOC ($SOC_b$) is set for each of the plurality of battery packs. A variation of state of charge ($SOC_i'$) for each battery pack is defined and calculated using the conditions and equations as described herein. For discharge (D<0), when $SOC_i>SOC_b$, $SOC_i'=SOC_i-SOC_b$ [Equation (3)], or when $SOC_i \leq SOC_b$, $SOC_i'=0$. For charge (D>0), when $SOC_i<SOC_b$, $SOC_i'=SOC_b-SOC_i$ [Equation (4)], or when $SOC_i \geq SOC_b$, $SOC_i'=0$. The term "when" used here is interchangeable with the term "if."

The steps further comprise calculating a voltage-charge combination factor ($C_i$) of each battery pack. $C_i$ is defined and calculated using Equation (5):

$$C_i=a*V_i'+b*SOC_i' \tag{5}$$

A respective power discharge or charge ($d_i$) for each battery pack is then calculated. The respective power discharge or charge ($d_i$) for each battery pack is calculated based on the total power demand (D) and the voltage-charge combination factor ($C_i$) of each battery pack, using Equation (6):

$$d_i=D*C_i/\text{Sum}(C_i) \tag{6}$$

Sum ($C_i$) is a sum of the voltage-charge combination factor of ($C_i$) of each and every of the plurality of battery packs. A power share (in percentage) for discharge or charge of a respective battery pack is represented by a ratio of $C_i/\text{Sum}(C_i)$. When the respective power discharge or charge of a certain battery pack is zero, the specific battery pack is kept idle without discharging or charging.

The controller 60 is configured to provide signals with instructions to the plurality of battery packs 20 and the one or more power converters for discharging power from or charging power to the plurality of battery packs 20 based on the respective power discharge or charge of each battery pack and/or keeping a certain battery pack idle.

The controller 60 is also configured to repeat some or all the steps to re-determine the respective power discharge or charge for each battery pack in a second time interval after the first time interval ends.

The time interval can be in any suitable ranges. The first and the second time intervals can be the same or different. The controller 60 can be configured to dynamically control discharging or charging of the plurality of battery packs by updating the respective power discharge or charge for each battery pack instantaneously with time.

The present disclosure provides a controller 60 as described herein for controlling discharge of a system 100 comprising a plurality of battery packs 20. The controller 60 is configured to control discharge or charge of heterogeneous battery packs 20, for example, in an electrical energy storage system. The controller 60 is configured to discharge power from the plurality of battery packs 20 to a grid or load 85 or charge power to the plurality of battery packs 20.

The controller 60 is configured to provide signals with instructions to the plurality of battery packs 20 and the one or more power converters 10 for discharging power from (or charging power to) the plurality of battery packs based on the respective discharge power of each battery pack and/or keeping a certain battery pack idle. The controller 60 is configured for controlling discharge or charge of heterogeneous battery packs 20, for example, in an electrical energy storage system. In some embodiments, the controller 60 is configured to discharge power from the plurality of battery packs to a grid or load, or charge power from the grid or load to the plurality of battery packs.

The present disclosure also provides a method 200 for controlling discharge or charge of a system 100 comprising a plurality of battery packs 20 through a controller 60 therein as described herein.

Figure 3:
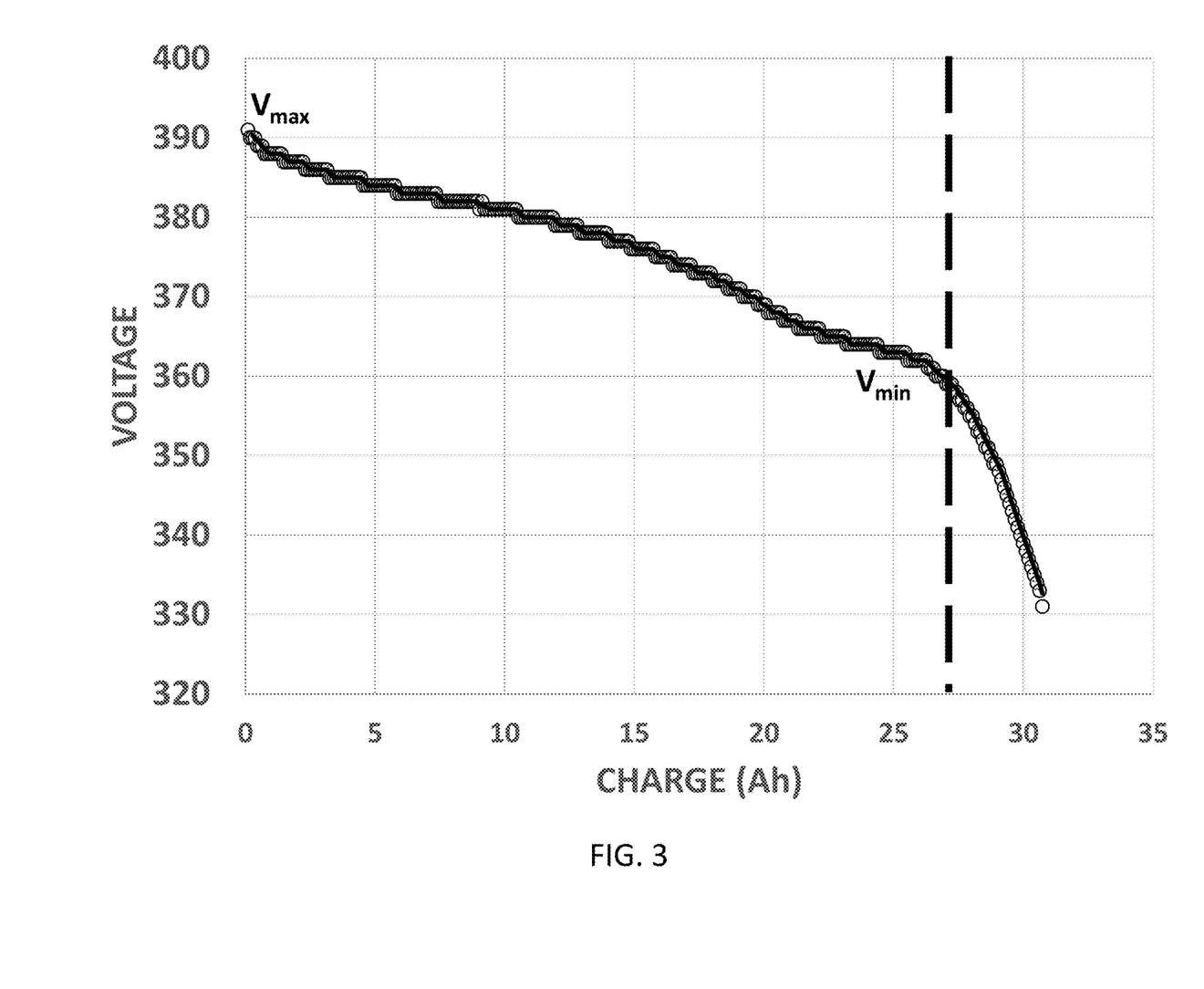
FIG. 3 shows the relationship between voltage (V) and charge flow (Ah) of an exemplary battery pack in some embodiments.

Different battery packs, especially second-life or used batteries or batteries that have different capacities and ratings, have varying voltage-charge characteristics. Referring to FIG. 3, an exemplary curve of voltage with charge flow of an exemplary battery pack 20 during a discharging process is shown. The input parameter may include voltage, current and time. Charge or charge flow (Q) is calculated from the current flow and the time elapsed. The voltage has a unit of volt (v), and the charge flow has a unit of Amp* hour (Ah) or coulomb. As shown in FIG. 3, Vmax is the voltage of such a battery pack when it is fully charged or it is at its maximum allowable charge level. Vmin is the voltage of such a battery pack when it is depleted of charge or it reaches its minimum allowable charge level.

The curve of voltage versus charge can be empirically generated at constant level of discharge while monitoring the current flow over the discharge period until the voltage drops beyond a user-defined minimum limit (Vmin), shown by the vertical dotted line in FIG. 3. The current and the voltage follow the same or similar trend with increase in charging time. In some embodiments, the curves of voltage versus charge are empirically generated at constant level of discharge while monitoring the current flow over the discharge period until the voltage drops beyond a user-defined minimum limit, shown by the intersection of the dotted vertical line with horizontal line from the y-axis.

Different discharge rates may yield different voltage discharge curves for the same battery packs. A family of curves at different discharge rates can be provided for each respective battery pack 20, and can be used to track the voltage trajectory of the packs for a given dispatch episode. In some embodiments, a technique such as extrapolation, interpolation, or averaging is used to get a representative curve. In one curve, when the voltage decreases beyond Vmin during discharge, such a battery pack shows a significantly higher voltage gradient and depletes more quickly. This lower limit point can be also referred as voltage collapse. In some embodiments, Vmax and Vmin are open circuit voltage specified by manufacturer or derived from pre-determined voltage-charge curves. The range of from Vmin to Vmax may be in a range of from 400 volts to 1,000 volts.

A voltage distribution parameter V* of a battery pack 20 having a present voltage (V) is defined as (V−Vmin)/(Vmax−Vmin). A voltage distribution parameter ($V_i'$) for a cell in a respective battery pack is defined and calculated using Equation (2):

$$V_i' = (V_i/N_{ci} - V_{c\,min})/(V_{c\,max} - V_{c\,min}) \quad (2).$$

The voltage distribution parameter V* of a battery pack 20 and the voltage distribution parameter ($V_i'$) for a cell may be in any suitable range, for example, in a range of from 50% to 95% in some embodiments.

FIG. 4 illustrates an exemplary method 200 for controlling or managing discharge or charge of a plurality of battery packs 20 in a system 100 in accordance with some embodiments. The plurality of battery packs 20 are heterogeneous battery packs selected from new batteries, second-use electric vehicle (EV) batteries, or combinations thereof. The plurality of battery packs 20 are connected in parallel, in series, or in a combination thereof. The plurality of battery packs 20 are connected preferably in parallel.

Referring to FIG. 4, at step 202, characteristic data of each battery pack 20 are collected. The characteristic data of each battery pack 20 include a present voltage ($V_i$), state of charge ($SOC_i$), a number of cells in each battery packs (Nc), a maximum voltage ($V_{c\,max}$) and a minimum voltage ($V_{c\,min}$) of a cell.

The minimum and maximum voltage of each battery pack 20 can be calculated according to the number of the cells in the respective pack and the configuration, in which the cells are arranged. For example, if maximum and minimum voltages of each cell are 4.2V and 3.5V, respectively, and a battery pack includes 144 cells, Vmax for the pack is 4.2×144 V and Vmin for such a battery pack is 3.5×144 V.

At step 204, a total power demand (D) needed to be dispatched from the system 100 or to be charged to the system in a first time interval is received by the controller 60. As described herein, a total power demand may be received from EMS 110. The total power demand (D) in the first time interval may also be calculated by the controller 60 based on the information from the EMS 110.

At step 206, a first weighting factor (a) and a second weighting factor (b) for power assignment based on voltage and state of charge of each battery pack, respectively, are assigned. As shown in Equation (1), the sum of a and b is equal to 1. The weighing parameters a and b can be adjustable. For example, when a battery pack is relatively new, the value of b can be close to 1 and the value of a can be close to 0. As such a battery ages, the value of b will be adjusted to decrease and the value of a starts to increase correspondingly.

At step 210, a respective power discharge or charge (di) for each battery pack is determined. In some embodiments, the respective power discharge or charge is calculated based on the present voltage ($V_i$), the state of charge ($SOC_i$), the number of cells in each battery packs (Nci), the maximum voltage ($V_{c\,max}$) and the minimum voltage ($V_{c\,min}$) of a cell, the first weighting factor (a), the second weighting factor (b), and the total power demand (D). For example, a respective power discharge or charge for each battery pack (di) is determined through steps including steps 212-220 as shown in FIG. 5.

At step 212, a respective voltage distribution parameter ($V_i'$) for a cell in a respective battery pack is calculated using Equation (2):

$$V_i' = (V_i/N_{ci} - V_{c\,min})/(V_{c\,max} - V_{c\,min}) \quad (2).$$

In some embodiments, the cells in one battery packs are the same, and share the same $V_i'$. Or the cells in one battery pack are averaged out to provide one value of $V_i$.

At step 214, a baseline SOC ($SOC_b$) is set or selected for each of the plurality of battery packs. The baseline SOC ($SOC_b$) for each of the plurality of battery packs can be any suitable range, for example, from 10% to 90%, from 20% to 80%, from 30% to 70%, from 20% to 60%, or from 40% to 60% (e.g., 25%, 30%, 35%, 40%, 45%, 50%, 55%, 60%). The baseline SOC is established to ensure each battery pack having a minimum charge during a discharging or charging process, so the battery packs 20 are protected.

At step 216, a variation of state of charge ($SOC_i'$) for each battery pack is calculated using the conditions and equations as described herein. For discharge (D<0), if $SOC_i > SOC_b$, then $SOC_i'$ is calculated using Equation (3):

$$SOC_i' = SOC_i - SOC_b \quad (3).$$

If $SOC_i \leq SOC_b$ during a discharging process, $SOC_i' = 0$.

For charge (D>0), if $SOC_i < SOC_b$, $SOC_i'$ is calculated using Equation (4):

$$SOC_i' = SOC_b - SOC_i \quad (4).$$

Otherwise, $SOC_i' = 0$.

At step 218, a voltage-charge combination factor ($C_i$) of a respective battery pack 20 is calculated using Equation (5):

$$C_i = a*V_i' + b*SOC_i' \quad (5).$$

The calculations above can be performed for each battery pack from 1 to n (the number of the total battery in a system.

At step 220, a respective power discharge or charge ($d_i$) for each battery pack is then calculated based on the total power demand (D) and the voltage-charge combination factor ($C_i$) of each battery pack, using Equation (6):

$$d_i = D*C_i/\text{Sum}(C_i) \quad (6).$$

Sum ($C_i$) is a sum of the voltage-charge combination factor of ($C_i$) of each and every of the plurality of battery packs including from 1 to n. A power share (in percentage) for discharge or charge of a respective battery pack is represented by a ratio of $C_i/\text{Sum }(C_i)$. When the respective power discharge or charge of a certain battery pack is zero, the specific battery pack is kept idle without discharging or charging.

In some embodiments, even though the plurality of battery packs discharge to meet a requirement for the power demand (D), it is possible that one or more of the battery packs may need to be charged. This is illustrated in the Examples. Or even though the plurality of battery packs are charged to accept the power demand (D) from the EMS, it is possible that one or more of the battery packs may need to be charged.

Referring back to FIG. 4, the controller 60 provide signals with instructions to the plurality of battery packs 20 and the one or more power converters for discharging power from or charging power to the plurality of battery packs 20 based on the respective power discharge or charge of each battery pack and/or keeping a certain battery pack idle. The discharging or charging process occurs.

Power from the plurality of battery packs 20 is discharged or the power will be charged to the battery packs 20 according to the instructions. After each process, for each battery pack, an alternate curve of voltage versus charge might be generated. Sometimes the characteristic data of each battery pack may be the same.

At step 240, after the first time interval is over, some or all the steps above can be repeated to re-determine the respective power discharge or charge for each battery pack in a second time interval. The time interval can be in any suitable ranges. The first and the second time intervals can be the same or different. The first and the second time intervals are in any range, for example, from 10 second to 2 hours, from 1 minute to 1 hour, and can be the same or different. The interval can be defined by a user. For example, each time interval may be 1 minute, 2 minutes, 5 minutes, 10 minutes, 15 minutes, 20 minutes, 25 minutes, 30 minutes, 35 minutes, 60 minutes, or any suitable time period. The controller 60 can be configured to dynamically control discharging or charging of the plurality of battery packs by updating the respective power discharge or charge for each battery pack instantaneously with time.

After step 240, the controller 60 re-assigns power discharge or charge for the plurality of battery packs 20 after the time interval ends to a battery pack, by repeating some or all of the steps including steps 202, 204, 206, 210 (including steps 212, 214, 216, 218, and 220), and 230. In some embodiments, the repeated process goes back to and starts from step 202. In some embodiments, the repeated process goes back to and starts from step 204. Sometimes when a voltage collapse occurs to one battery pack or the battery needs to be replaced, the process can be stopped and the repeating cycle can be restarted when ready. The discharging or charging process of the plurality of battery packs can also be dynamically controlled by updating the respective power discharge or charge of each battery pack instantaneously with time. The time interval can be very short or minimal.

Overall, the methods provided in the present disclosure utilize a plurality of heterogeneous battery packs to provide a consistent and long-lasting dispatch profiles to satisfy the dispatch requirement for discharging or charging from the EMS. The managed throughput leads to improved life and performance for an energy storage system.

In some embodiments, the system 100 includes a heterogeneous battery packs 20 integrated with bidirectional converter (or inverter) 10 connected to the grid or microgrid 85 that can be dispatched remotely or locally using this intelligent algorithm running in local or cloud-based controller 60. In some embodiments, the algorithm requires prior knowledge of the voltage-charge curves, which can be acquired during commissioning and subsequently updated as the battery packs age or wear out due to use/disuse.

The system, the controller, and the method provided in the present disclosure offer many advantages. For example, a variety of battery packs such as used EV battery packs having different quality can be used. No pre-selection or dismantle of the battery packs are needed. The system, the controller, and the method extend the life of some or all battery packs, and they also offer flexibility in maintaining and upgrading the system as well.

EXAMPLES

An exemplary energy storage system 100 includes 9 battery packs, each of which is connected with a single inverter. The battery packs can be discharged maximum at 0.5 C and charged at 0.5 C. The capacities and voltage characteristics are different among the battery packs, so their recommended/allowable maximum charge and discharge rates are different. It is assumed that the battery packs have the characteristics data as shown in Table 1.

TABLE 1

| Pack No. | Maximum Power (kW) | Capacity (kWh) | Vi | SOCi |
|---|---|---|---|---|
| 1 | 3.16 | 6.32 | 455.31 | 0.58 |
| 2 | 6.66 | 13.31 | 446.62 | 0.20 |
| 3 | 6.95 | 13.90 | 544.81 | 0.17 |
| 4 | 7.72 | 15.45 | 568.90 | 0.61 |
| 5 | 8.47 | 16.94 | 477.01 | 0.48 |
| 6 | 8.73 | 17.45 | 468.12 | 0.43 |

TABLE 1-continued

| Pack No. | Maximum Power (kW) | Capacity (kWh) | Vi | SOCi |
|---|---|---|---|---|
| 7 | 10.55 | 21.10 | 475.60 | 0.02 |
| 8 | 13.66 | 27.31 | 501.14 | 0.83 |
| 9 | 14.10 | 28.20 | 540.58 | 0.26 |

The voltage Vi and SOCi are the instantaneous measured voltage and state of charge of the individual battery packs. Each battery pack is assumed to be made of 144 individual cells. It is desired that each cell is operated in the range of 4.2V and 3V. So the maximum voltage ($V_{c\ max}$) and the minimum voltage ($V_{c\ min}$) of a cell is 4.2V and 3V, respectively.

For illustration only, it is assumed that dispatch power (D) of -17.56 kW is required by the energy storage system within a time interval, for example, of 15 minutes. The negative sign of the dispatch power means that discharge is needed.

Table 2 shows the parameters calculated in the method, including the voltage distribution parameter ($V_i'$) for a cell, the variation of state of charge ($SOC_i'$), the voltage-charge combination factor ($C_i$) of each battery pack, and the respective power discharge or charge ($d_i$) for each battery pack.

TABLE 2

| Pack No. | $V_i'$ | $SOC_i'$ | $C_i$ | $d_i$ |
|---|---|---|---|---|
| 1 | 0.13 | 0.33 | 0.24 | -1.86 |
| 2 | 0.08 | -0.05 | 0.01 | -0.08 |
| 3 | 0.65 | -0.08 | 0.25 | -1.93 |
| 4 | 0.79 | 0.36 | 0.56 | -4.31 |
| 5 | 0.26 | 0.23 | 0.25 | -1.90 |
| 6 | 0.21 | 0.18 | 0.19 | -1.50 |
| 7 | 0.25 | -0.23 | -0.01 | 0.09 |
| 8 | 0.40 | 0.58 | 0.50 | -3.84 |
| 9 | 0.63 | 0.01 | 0.29 | -2.24 |

The voltage distribution parameter ($V_i'$) for a cell is calculated by the controller according to $Vi'=(((Vi/144)-3)/(4.2-3))$. $SOC_b$ is an input parameter to the algorithm where it is the desired baseline SOC for each pack. For illustration purposes, it is chosen as 25%. The process is discharge for the plurality of battery packs, and each battery pack has a SOCi higher than $SOC_b$. So $SOCi'=SOCi-SOC_b$.

The first weighting factor (a) and a second weighting factor (b) for power assignment based on voltage and state of charge of each battery pack, respectively. These two weighting factors are also input parameters with their combined weightage as 1. For illustration purposes, the first weighting factor (a), which is for voltage, is chosen as 0.45. The second weighting factor (b), which is for SOC, is chosen as 0.55. The voltage-charge combination factor ($C_i$) of each battery pack is calculated using Equation $C_i=a*+b*SOC_i'$.

As shown in Table 2, the sign for $C_i$ of battery pack No. 7 is different from those of the other packs. This implies that if the overall dispatch required is discharging at the required level, in this particular example one of the packs will be charging. As shown in Table 2, the sign for the respective power discharge or charge ($d_i$) of battery pack No. 7 is positive (meaning charged) while the other battery packs discharge power. As shown in Table 2, the total power dispatch is -17.56 kW. All the packs discharge except battery pack No. 7 is charged at 0.09 kW in this time interval.

This process continues for 15 minutes. At the end of 15 minutes, the EMS will give the new command for the total required dispatch power (D). The controller will have the new measurement for the instantaneous voltage and SOC of each pack. The controller then calculates the individual dispatch powers from the packs once again according to the calculations shown above.

In another aspect, the present disclosure also at least one tangible, non-transitory machine readable medium encoded with the one or more programs as described herein.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods. The computer or the control unit may be operated remotely using a cloud based system.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
   a plurality of battery packs;
   one or more power converters, each power converter coupled with at least one of the plurality of battery packs and configured to convert direct current (DC) from one battery pack to alternating current (AC) or vice versa; and
   a controller coupled to the plurality of battery packs and the one or more power converters, the controller comprising one or more processor and at least one tangible, non-transitory machine readable medium encoded with one or more programs configured to perform steps comprising:
   collecting characteristic data of each battery pack including a present voltage ($V_i$), state of charge ($SOC_i$), a number of cells in each battery packs (Nc), a maximum voltage ($V_{c\ max}$) and a minimum voltage ($V_{c\ min}$) of a cell;
   receiving a total power demand (D) needed to be dispatched from the system or to be charged to the system in a first time interval;
   assigning a first weighting factor (a) and a second weighting factor (b) for power assignment based on voltage and state of charge of each battery pack, respectively, wherein a+b=1;
   determining a respective power discharge or charge for each battery pack based on the present voltage ($V_i$), the state of charge ($SOC_i$), the number of cells in each battery packs (Nc), the maximum voltage ($V_{c\ max}$) and the minimum voltage ($V_{c\ min}$) of a cell, the first weighting factor (a), the second weighting factor (b), and the total power demand (D); and providing signals with instructions to the plurality of battery packs and the one or more power converters for discharging power from or charging power to the plurality of battery packs based on the respective power discharge or charge of each battery pack and/or keeping a certain battery pack idle.

2. The system of claim 1, wherein the step of determining a respective power discharge or charge for each battery pack comprises:

calculating voltage distribution parameter ($V_i'$) for each cell in a respective battery pack, wherein $V_i'=(V_i/N_{ci}-V_{c\ min})/(V_{c\ max}-V_{c\ min})$;

setting a baseline SOC ($SOC_b$) for each of the plurality of battery packs;

calculating a variation of state of charge ($SOC_i'$) for each battery pack by using conditions and equations including:

for discharge (D<0), when $SOC_i>SOC_b$, $SOC_i'=SOC_i-SOC_b$ and when $SOC_i \leq SOC_b$, $SOC_i'=0$; or for charge (D>0), when $SOC_i<SOC_b$, $SOC_i'=SOC_b-SOC_i$ and when $SOC_i \geq SOC_b$, $SOC_i'=0$;

calculating a voltage-charge combination factor ($C_i$) of each battery pack, wherein $C_i$ is defined as $C_i=a*V_i'+b*SOC_i'$; and calculating a respective power discharge or charge (di) for each battery pack based on the total power demand (D) and the voltage-charge combination factor ($C_i$) of each battery pack, wherein $d_i=D*C_i/Sum(C_i)$, and Sum ($C_i$) is a sum of the voltage-charge combination factor of ($C_i$) of each of the plurality of battery packs.

3. The system of claim 1, wherein the controller is configured to repeat the steps to re-determine the respective power discharge or charge for each battery pack in a second time interval after the first time interval ends.

4. The system of claim 1, wherein the plurality of battery packs are heterogeneous battery packs selected from new batteries, second-use electric vehicle (EV) batteries, or combinations thereof.

5. The system of claim 1, further comprising one or more battery power management unit (BPMU), each BPMU connected with one or more battery packs and configured to monitor the one or more battery packs and provide characteristic data of the one or more battery packs to the controller.

6. The system of claim 1, wherein the system is an electrical energy storage system, and the total power demand is provided from an upper level energy management system.

7. A controller for controlling discharge or charge of a system comprising a plurality of battery packs, comprising one or more processor and at least one tangible, non-transitory machine readable medium encoded with one or more programs configured to perform steps of:

collecting characteristic data of each battery pack including a present voltage ($V_i$), state of charge ($SOC_i$), a number of cells in each battery packs (Nc), a maximum voltage ($V_{c\ max}$) and a minimum voltage ($V_{c\ min}$) of a cell;

receiving a total power demand (D) needed to be dispatched from the system or to be charged to the system in a first time interval;

assigning a first weighting factor (a) and a second weighting factor (b) for power assignment based on voltage and state of charge of each battery pack, respectively, wherein a+b=1;

determining a respective power discharge or charge for each battery pack based on the present voltage ($V_i$), the state of charge ($SOC_i$), the number of cells in each battery packs ($N_{ci}$), the maximum voltage ($V_{c\ max}$) and the minimum voltage ($V_{c\ min}$) of a cell, the first weighting factor (a), the second weighting factor (b), and the total power demand (D); and providing signals with instructions to the plurality of battery packs and one or more power converters for discharging power from or charging power to the plurality of battery packs based on the respective power discharge or charge of each battery pack and/or keeping a certain battery pack idle.

8. The controller of claim 7, wherein the controller is configured to determine a respective power discharge or charge for each battery pack through steps comprising:

calculating voltage distribution parameter ($V_i'$) for each cell in a respective battery pack, wherein $V_i'=(V_i/N_{ci}-V_{c\ min})/(V_{c\ max}-V_{c\ min})$;

setting a baseline SOC ($SOC_b$) for each of the plurality of battery packs;

calculating a variation of state of charge ($SOC_i'$) for each battery pack by using conditions and equations including:

for discharge (D<0), when $SOC_i>SOC_b$, $SOC_i'=SOC_i-SOC_b$ and when $SOC_i \leq SOC_b$, $SOC_i'=0$; or for charge (D>0), when $SOC_i<SOC_b$, $SOC_i'=SOC_b-SOC_i$ and when $SOC_i \geq SOC_b$, $SOC_i'=0$;

calculating a voltage-charge combination factor ($C_i$) of each battery pack, wherein $C_i$ is defined as $C_i=a*V_i'+b*SOC_i'$; and calculating a respective power discharge or charge ($d_i$) for each battery pack based on the total power demand (D) and the voltage-charge combination factor ($C_i$) of each battery pack, wherein $d_i=D*C_i/Sum(C_i)$, and Sum ($C_i$) is a sum of the voltage-charge combination factor of ($C_i$) of each of the plurality of battery packs.

9. The controller of claim 7, wherein the controller is configured to repeat the steps to re-determine the respective power discharge or charge for each battery pack in a second time interval after the first time interval ends.

10. The controller of claim 7, wherein the controller is configured to discharge power from the plurality of battery packs to a grid or load, or charge power from the grid or load to the plurality of battery packs.

11. A method for controlling discharge or charge of a system comprising a plurality of battery packs through a controller therein, comprising:

collecting characteristic data of each battery pack including a present voltage ($V_i$), state of charge ($SOC_i$), a number of cells in each battery packs (Nc), a maximum voltage ($V_{c\ max}$) and a minimum voltage ($V_{c\ min}$) of a cell;

receiving a total power demand (D) needed to be dispatched from the system or to be charged to the system in a first time interval;

assigning a first weighting factor (a) and a second weighting factor (b) for power assignment based on voltage and state of charge of each battery pack, respectively, wherein a+b=1;

determining a respective power discharge or charge for each battery pack based on the present voltage ($V_i$), the state of charge ($SOC_i$), the number of cells in each battery packs (Nci), the maximum voltage ($V_{c\,max}$) and the minimum voltage ($V_{c\,min}$) of a cell, the first weighting factor (a), the second weighting factor (b), and the total power demand (D); and providing signals with instructions to the plurality of battery packs and one or more power converters for discharging power from or charging power to the plurality of battery packs based on the respective power discharge or charge of each battery pack and/or keeping a certain battery pack idle.

12. The method of claim 11, wherein determining a respective power discharge or charge for each battery pack comprises:

calculating voltage distribution parameter ($V_i'$) for each cell in a respective battery pack, wherein $V_i'=(V_i/N_{ci}-V_{c\,min})/(V_{c\,max}-V_{c\,min})$;

setting a baseline SOC ($SOC_b$) for each of the plurality of battery packs;

calculating a variation of state of charge ($SOC_i'$) for each battery pack by using conditions and equations including:

for discharge (D<0), when $SOC_i > SOC_b$, $SOC_i' = SOC_i - SOC_b$ and when $SOC_i \leq SOC_b$, $SOC_i'=0$; or for charge (D>0), when $SOC_i < SOC_b$, $SOC_i' = SOC_b - SOC_i$ and when $SOC_i \geq SOC_b$, $SOC_i'=0$;

calculating a voltage-charge combination factor ($C_i$) of each battery pack, wherein $C_i$ is defined as $C_i = a*V_i' + b*SOC_i'$; and calculating a respective power discharge or charge ($d_i$) for each battery pack based on the total power demand (D) and the voltage-charge combination factor ($C_i$) of each battery pack, wherein $d_i = D*C_i/\text{Sum}(C_i)$, and Sum ($C_i$) is a sum of the voltage-charge combination factor of ($C_i$) of each of the plurality of battery packs.

13. The method of claim 11, wherein the plurality of battery packs are heterogeneous battery packs selected from new batteries, second-use electric vehicle (EV) batteries, or combinations thereof.

14. The method of claim 11, wherein the system is an electrical energy storage system, and the total power demand is provided from an upper-level energy management system.

15. The method of claim 11, wherein power is discharged from the plurality of battery packs to a grid or load, or power is charged from the grid or load to the plurality of battery packs.

16. The method of claim 12, wherein the baseline SOC ($SOC_b$) for each of the plurality of battery packs is in a range of from 10% to 90%.

17. The method of claim 12, wherein the baseline SOC ($SOC_b$) for each of the plurality of battery packs is in a range of from 20% to 60%.

18. The method of claim 11, wherein the certain battery pack is kept in idle when the respective power discharge or charge is assigned to zero.

19. The method of claim 11, further comprising: repeat the steps to re-determine the respective power discharge or charge for each battery pack in a second time interval after the first time interval ends.

20. The method of claim 11, wherein each the first time interval and the second time interval is in a range of from 1 minute to one hour.

* * * * *